(12) United States Patent
Minagawa

(10) Patent No.: US 9,557,948 B2
(45) Date of Patent: Jan. 31, 2017

(54) INFORMATION PROCESSING APPARATUS FOR ACTIVATING A PRINTER DRIVER UPON COMPLETION OF USER AUTHENTICATION

(71) Applicant: CANON KABUSHIKI KAISHA, Tokyo (JP)

(72) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/647,618

(22) PCT Filed: Oct. 24, 2013

(86) PCT No.: PCT/JP2013/006291
§ 371 (c)(1),
(2) Date: May 27, 2015

(87) PCT Pub. No.: WO2014/083757
PCT Pub. Date: Jun. 5, 2014

(65) Prior Publication Data
US 2015/0301773 A1    Oct. 22, 2015

(30) Foreign Application Priority Data
Nov. 29, 2012  (JP) .................... 2012-261309

(51) Int. Cl.
*G06F 3/12*  (2006.01)
*G06F 21/60*  (2013.01)
*G06F 21/31*  (2013.01)

(52) U.S. Cl.
CPC ............. *G06F 3/1268* (2013.01); *G06F 3/12* (2013.01); *G06F 3/1222* (2013.01); *G06F 3/1238* (2013.01); *G06F 3/1285* (2013.01); *G06F 3/1287* (2013.01); *G06F 3/1288* (2013.01); *G06F 21/31* (2013.01); *G06F 21/608* (2013.01); *G06F 3/1228* (2013.01); *G06F 2221/2115* (2013.01)

(58) Field of Classification Search
CPC ...................................... G06F 3/1268
USPC ............................... 358/1.13, 1.15
See application file for complete search history.

(56) References Cited

U.S. PATENT DOCUMENTS

2010/0253975 A1* 10/2010 Ida ................. G06F 21/608
                                                    358/1.15
2010/0259787 A1* 10/2010 Nagashima ........... G06F 3/1203
                                                    358/1.15
2010/0302573 A1* 12/2010 Hakozaki ............. G06F 3/1204
                                                    358/1.14

(Continued)

FOREIGN PATENT DOCUMENTS

JP  2000-056936 A  2/2000
JP  2004-240589 A  8/2004

(Continued)

*Primary Examiner* — Jacky X Zheng
(74) *Attorney, Agent, or Firm* — Canon USA, Inc. I.P. Division

(57) ABSTRACT

The present invention provides solution of a matter of authentication to be performed when print service is accessed using a printer driver so that content data is printed. The print service distributes a printer driver capable of transmitting authority information representing that user's authority for using the print service is transferred to the printer driver, the content data, and a print setting to a client.

7 Claims, 14 Drawing Sheets

(56) References Cited

U.S. PATENT DOCUMENTS

2012/0019855 A1\* 1/2012 Takahashi ............. G06F 3/1203
358/1.15

FOREIGN PATENT DOCUMENTS

| JP | 2008-290271 A | 12/2008 |
|----|---------------|---------|
| JP | 2009-200741 A | 9/2009 |
| JP | 2012-088838 A | 5/2012 |

\* cited by examiner

Fig. 4C

```
LOGIN
    USER ID    [_____] ─ 431
    PASSWORD   [_____] ─ 432
                          ─ 433
               [  LOGIN  ]
```

Fig. 4D

```
PRINTER LIST
           ─ 441          ─ 442
    MFP-01   [ INSTALL BYPASS DRIVER ]
    MFP-02   [ INSTALL BYPASS DRIVER ]
```

Fig. 4E

```
PRINT SETTING OF MFP-01
    DUPLEX PRINTING   [ 1-Side  ▽ ]
    COLOR SETTING     [ mono    ▽ ]
    PAGE SIZE         [ A4      ▽ ]

```
PERMISSION SCREEN

PERMISSION FOR BYPASS DRIVER TO ACCESS PRINT
    SERVICE IS REQUESTED.
    PERMISSION IS GIVEN?

[ PERMIT ]      [ REFUSE ]
```

Fig. 5

(a)
```xml
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

(b)
```xml
<PrintSettings>
    <Duplex>
        <Item>1-Side</Item>
    </Duplex>
    <Color>
        <Item>color</Item>
    </Color>
    <PaperSize>
        <Item>A4</Item>
    </PaperSize>
</PrintSettings>
```

(c)
```xml
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

(d)
```xml
<Register>
    <name>                541
        <Item>MFP-01</Item>
    </name>
    <RPID>                542
        <Item>RP-0001</Item>
    </RPID>
    <Capabilities>
        <Duplex>          543
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>          544
            <Item>1-Side</Item>
        </Duplex>
        <Color>
            <Item>color</Item>
        </Color>
        <PaperSize>
            <Item>A4</Item>
        </PaperSize>
    </PrintSettings>
    .........
</register>
```

(e)
```xml
<Printers>           551
    <id>
        <Item>SP-1</Item>
    </id>
    <name>
        <Item>MFP-01</Item>
    </name>
</printers>
```

(f)
```xml
<notification>
    <id>
        <Item> SP-1 </Item>
    </id>
</notification>
```

(g)
```xml
<fetch>
    <id>
        <Item> SP-1 </Item>
    </id>
</fetch>
```

(h)
```xml
<PrintJob>
    <id>                 561
        <Item>JOB_001</Item>
    </id>
    <title>              562
        <Item>Doc-001</Item>
    </title>
    <status>
        <Item>QUEUED</Item>
    </status>
    <dataUrl>            563
        <Item>Http://prt.srv.com/
        data/8023610500269699</Item>
    </dataUrl>
    <settingUrl>         564
        <Item>http://prt.srv.com/
        setting/8023610500269699</Item>
    </settingUrl>
</PrintJob>
```

Fig. 6A

| 611 | 612 | 613 | 614 | 615 |
|---|---|---|---|---|
| RPID | PRINTER NAME | CAPABILITIES | TICKET INITIAL VALUE | SPID |
| RP-0001 | MFP-01 | PC_1 | PT_1 | SP-1 |

Fig. 6B

| 621 | 622 | 623 | 624 | 625 | 626 |
|---|---|---|---|---|---|
| SPID | PRINTER NAME | RPID | CAPABILITIES | TICKET INITIAL VALUE | PRINTER OWNER |
| SP-1 | MFP-01 | RP-0001 | PC_1 | PT_1 | UserX |
| SP-2 | MFP-02 | RP-0002 | PC_2 | PT_2 | UserX |
| ... | ... | ... | ... | ... | ... |

Fig. 6C

| 631 | 632 | 633 | 634 | 635 | 636 | 637 | 638 |
|---|---|---|---|---|---|---|---|
| JOB ID | JOB NAME | SP ID | TICKET | PRINT DATA STORAGE LOCATION | TICKET STORAGE LOCATION | JOB OWNER | JOB STATUS |
| JOB_001 | Doc-001 | SP-1 | PT_J1 | http://... | http://... | UserX | Queued |

INFORMATION PROCESSING APPARATUS FOR ACTIVATING A PRINTER DRIVER UPON COMPLETION OF USER AUTHENTICATION

TECHNICAL FIELD

The present invention relates to an information processing apparatus, a print server system, a method for controlling the print server system, and a program which are included in a content print system which transmits print data to a printer through a network.

BACKGROUND ART

In general, a content data printing system configured such that a client transmits a print instruction to a server and the server which receives the print instruction converts content data to be printed into print data has been used. In recent years, an idea of cloud computing has attracted attention. The cloud computing is one of techniques, as well as the system described above, in which a server provides service to a client. The cloud computing is mainly characterized in that data conversion and data processing are executed in a distributed manner using a number of computing resources so that a number of requests transmitted from clients are processed at the same time. Nowadays, a great number of vendors provide various types of service through web service implemented in a cloud computing environment which realizes the cloud computing.

Among these vendors, Google (registered trademark) Inc. is remarkable. Google Inc. has taken proactive actions. For example, Google Inc. has a number of large data centers, proposes service provided in cooperation with a device, and develops a system of data communication between the device and the service. For example, Google Inc. develops a system of data communication for providing print service in cooperation with a printer, and releases an interface for a printer to perform data communication with a cloud computing environment provided by Google Inc. Since the interface is implemented in a printer, a client may specify the printer for printing even when the printer and a server are connected to each other through the Internet. This is referred to as a "cloud printing system".

In the cloud printing system, printers are managed by a server in an integrated manner. When a user of a client selects a printer managed by print service using a web application activated by a web browser and registers a job, printing is performed.

On the other hand, in intranet environments in which a server similarly manages printers in an integrated manner, a system in which the server manages printer drivers and the printer drivers are installed in a client has been widely used. Examples of the system include a "Point and Print" system provided by Microsoft Windows (registered trademark) and an installation system disclosed in PTL 1. In the "Point and Print" system, a setting is performed such that a printer driver installed in a server is shared, and a clone copy of the printer driver is installed in a client in response to a client's instruction. The printer driver of the server and the printer driver of the client may communicate with each other and device capability information and port information set in the server may be used in the client as they are. Furthermore, in PTL 1, a group printer driver (virtual printer driver) which is a group of printer drivers installed in a printer server is generated and shared. The group printer driver has a configuration of a printer driver and is installed in a client when the group printer driver in the server is selected by the client. When printing is to be performed by an application of the client, output is performed from a printer managed by the server by selecting the group printer driver. Here, print data generated by the group printer driver is transmitted to the server serving as a share source of the group printer driver and is output to an actual printer through a printer driver managed by the server.

In any case, a user of the client does not perform complicated processes including provision and installation of a printer driver and obtains a setup system having high user-friendliness.

CITATION LIST

Patent Literature

PTL 1: Japanese Patent Laid-Open No. 2004-240589

SUMMARY OF INVENTION

Technical Problem

A printer server included in the print system disclosed in PTL 1 is disposed in an intranet, and therefore, authentication is not taken into consideration when a printer driver accesses a printer server for printing. However, when print service is accessed using a printer driver and content data generated by an application installed in a client is to be printed, a matter of authentication is taken into consideration. However, a printer driver taking the matter of authentication into consideration has not been developed.

Accordingly, the present invention provides solution of a matter of authentication to be performed when print service is accessed using a printer driver for printing.

Solution to Problem

The present invention provides an information processing apparatus capable of communicating with a print server system including print service which generates a print job using content data and a print setting and which transmits the generated print job to a printer through a network. The information processing apparatus includes an activation unit configured to activate a printer driver which provides a print setting screen and which transmits content data stored in a memory of the information processing apparatus and a print setting input using the print setting screen to the print service through a network, and a transmission unit configured to transmit authority information representing that user's authority for using the print service is transferred to the printer driver when the user issues an instruction for printing to be performed through the printer driver after the printer driver is activated and transmit the content data and the print setting through the network.

Further features of the present invention will become apparent from the following description of exemplary embodiments with reference to the attached drawings.

BRIEF DESCRIPTION OF DRAWINGS

FIG. 4C is a diagram illustrating a user interface of a login screen displayed by a web application or the print service.

FIG. 4D is a diagram illustrating a user interface of a printer list screen displayed by the print service.

FIG. 4E is a diagram illustrating a user interface of a print setting screen displayed by a desktop application.

FIG. 4F is a diagram illustrating a user interface of an access permission screen displayed by the print service.

FIG. 5 includes diagrams illustrating notification information described by XML wherein (a) of FIG. 5 is a diagram illustrating capabilities, (b) of FIG. 5 is a diagram illustrating a ticket initial value, (c) of FIG. 5 is a diagram illustrating a ticket, (d) of FIG. 5 is a diagram illustrating a printer registration request, (e) of FIG. 5 is a diagram illustrating a printer registration response, (f) of FIG. 5 is a diagram illustrating notification of completion of job preparation (notification information A), (g) of FIG. 5 is a diagram illustrating a request for obtaining job information, and (h) of FIG. 5 is a diagram illustrating job information (notification information B) as a response.

FIG. 6A is a diagram illustrating a printer information management table managed by the printer.

FIG. 6B is a diagram illustrating a printer management table managed by the print service.

FIG. 6C is a diagram illustrating a job management table managed by the print service.

DESCRIPTION OF EMBODIMENTS

Figure 1:
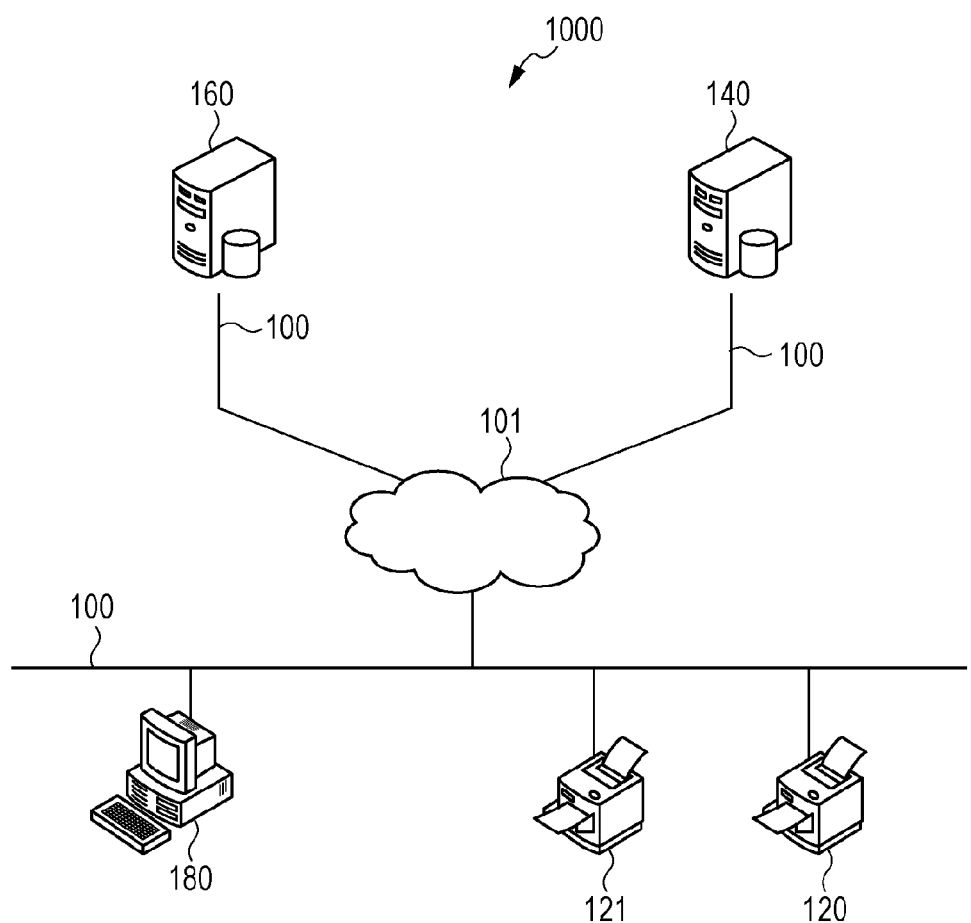
FIG. 1 is a diagram illustrating a configuration of a content data printing system.

Before embodiments are described, problems of the present invention in one aspect will be described. Architecture of printing performed by a printer managed by a server in an intranet environment and architecture of printing performed by a printer managed by print service on the Internet are considerably different from each other. Therefore, when printing is performed using a desktop application of a client through print service, a special virtual printer driver which mediates therebetween is used.

The virtual printer driver has the following two capabilities. As a first capability, the virtual printer driver serves as an interface of a printer driver and receives an instruction for printing supplied from a desktop application and generates a job receivable by the print service. As a second capability, the virtual printer driver serves as an interface released by the print service and registers a generated job in the print service. Use of the virtual printer driver having the capabilities enables printing by a printer managed by the print service using a desktop application.

However, there arise two problems. As a first problem, when a printer managed by the print service is to be used, a complicated setup is required. As described hereinafter, the print service has architecture for managing printers which is different from that of printer drivers. When a printer of the print service is to be specified by the virtual printer driver, a unique ID of the printer is obtained. Furthermore, when a print setting is to be performed, capability information representing capabilities of the printer and ticket information which stores the print setting are obtained. Obtainment of the information for each printer for the setting is an extremely complicated process. In the "Point and Print" system and PTL 1, a type of an operating system (OS) of a server and a type of an OS of a client are the same as each other, and therefore, a system having high user-friendliness is provided. However, the print service is general service on the Internet, and therefore, any client having a web browser may be connected to the print service. Accordingly, it is hard to provide the same system.

As a second problem, an authentication system of an intranet and an authentication system of the print service are different from each other, and user authentication is required at a time of connection to the print service. In an intranet environment, access to files in a server and a printing request to the server are processed by the same authentication system. Specifically, if a client logs in a server once or the client logs in a domain the same as that of the server, additional user authentication is not required when printing is performed by a printer managed by the server. However, since the print service operates on the Internet which is outside of the intranet, user authentication is required for connection when printing is requested. If the user authentication is required every time printing is performed, the user feels inconvenience. In embodiments of the present invention, methods for solving these problems will be described.

Next, terms used in the present invention are defined. The term "desktop application" represents an application operated in a client PC and is also referred to as a "stand alone application". The desktop application is also simply referred to as an "application" in many cases. However, in the present invention, the term "desktop application" is employed so as to be distinguished from web applications. When printing is performed using a desktop application, print data is supplied through an OS to a printer driver installed in a client PC. The printer driver converts the received print data into a print job which can be interpreted by a printer and transmits the print job to the printer so that printing is realized.

The term "web application" represents an application utilizing functions and features of the web. In general, a web application is used on a web browser in many cases. When printing is performed using a web application, a print data file generated by the web application is registered in the print service and the data is obtained by a printer so that the printing is realized. Examples of the print data file include portable document format (PDF) files and XML paper specification (XPS) files. A similar output object may be obtained when the web browser prints content data displayed by the web browser itself. However, the output object is classified into printing using a web browser, that is, printing using a desktop application.

The term "bypass driver" represents a virtual printer driver which connects a desktop application and print service to each other. The bypass driver has a configuration of a printer driver and is installed in a client PC as a printer driver. Furthermore, as with normal printer drivers, the bypass driver has an interface for receiving a print instruction issued by a desktop application and has a function of converting the received print instruction into print data. Unlike the normal printer drivers, the bypass driver performs registration of the converted print data in the print service instead of transmission of the converted print data to a printer body. Thereafter, printing of the registered print data is realized by a function of the print service. The function of the bypass driver has been briefly described hereinabove. The bypass driver functions differently from the normal printer drivers although having the configuration of the printer drivers. Therefore, the bypass driver is referred to as a "virtual printer driver" in this specification. Furthermore, as with the normal printer drivers, the bypass driver displays a print setting screen and accepts input of a print setting performed by a user.

The term "job" represents a group of print data and a ticket obtained when printing is performed using a web application. The print data corresponds to files of a format which can be interpreted by the print service, such as PDF files and XPS files, and may be content data itself. The ticket corresponds to information including a print setting performed by a user and is often the same meaning as the print setting. Printing is realized when the job is registered in the print service. The term "job information" represents storage locations and features of the print data and the ticket. The bypass driver described above also generates a "job" and registers the job in the print service.

The term "print job" represents a job (print data and a print setting) which is rendered and converted into a format suitable for a target printer. In general, the print job corresponds to a page description language (PDL) or image data. Since rendering is not required depending on a printer, the term "job" including content data and a ticket representing a print setting may correspond to the term "print job".

Hereinafter, embodiments of the present invention will be described with reference to the accompanying drawings.
First Embodiment First, a configuration of a content data printing system 1000 according to a first embodiment will be described. FIG. 1 is a diagram illustrating the configuration of the content data printing system 1000. The content data printing system 1000 includes a client 180 and at least one printer 120 (and 121 and so on). The two apparatuses are disposed in a user environment and connected to each other through a network 100. The network 100 is connected to the Internet 101 and the apparatuses may be communicated with each other through the Internet 101. The client 180 and the printer 120 may be connected to each other through the Internet 101. The content data printing system 1000 further includes a web application server group 160 and a print server group 140.

The two server groups may be provided by the same vendor. In this case, both of the server groups may be connected to each other through the network 100. The apparatuses and the server groups included in the content data printing system 1000 may be connected to one another through the Internet 101 and may perform data communication with one another. Although only one apparatus is illustrated as each apparatus, a plurality of apparatuses may be provided. Furthermore, although each of the server groups includes a plurality of servers, only one server may be used. The term "server system" represents a system including at least one server. For example, the term "print server system" represents a system including at least one print server.

Figure 2:
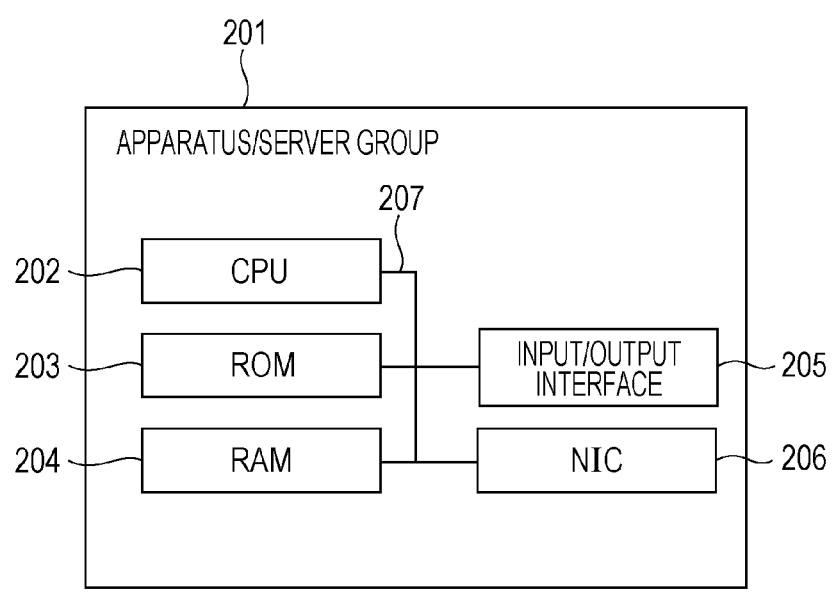
FIG. 2 is a diagram illustrating a hardware configuration of each of apparatuses and server groups included in the content data printing system.

Next, a hardware configuration of the information processing apparatuses and the server groups included in the content data printing system 1000 will be described. FIG. 2 is a diagram illustrating the hardware configuration of each of the apparatuses and the server groups included in the content data printing system 1000. A reference numeral 201 denotes each of the apparatuses and the server groups included in the content data printing system 1000. A reference numeral 202 denotes a central processing unit (CPU) which executes various programs so as to realize various functions. A reference numeral 203 denotes a read only memory (ROM), that is, a memory unit which stores various programs. A reference numeral 204 denotes a random-access memory (RAM). The CPU 202 loads a program stored in the ROM 203 into the RAM 204 serving as a memory unit and executes the program.

Furthermore, the RAM 204 also serves as the memory unit used as a temporal working storage region for the CPU 202. An input/output interface 205 is an interface unit which transmits data to displays (not illustrated) connected to the apparatuses and the server groups and which receives data from a pointing device (not illustrated). A network interface card (NIC) 206 is a unit which connects the apparatuses and the server groups included in the content data printing system 1000 to the network 100. The units described above are capable of transmitting and receiving data through a bus 207. Furthermore, the printer 120 includes a print unit (not illustrated) which is capable of transmitting data to and receiving data from the units through the bus 207. The print unit corresponds to an image forming unit capable of printing image data such as a raster image on a recording medium such as a recording sheet.

Figure 3:
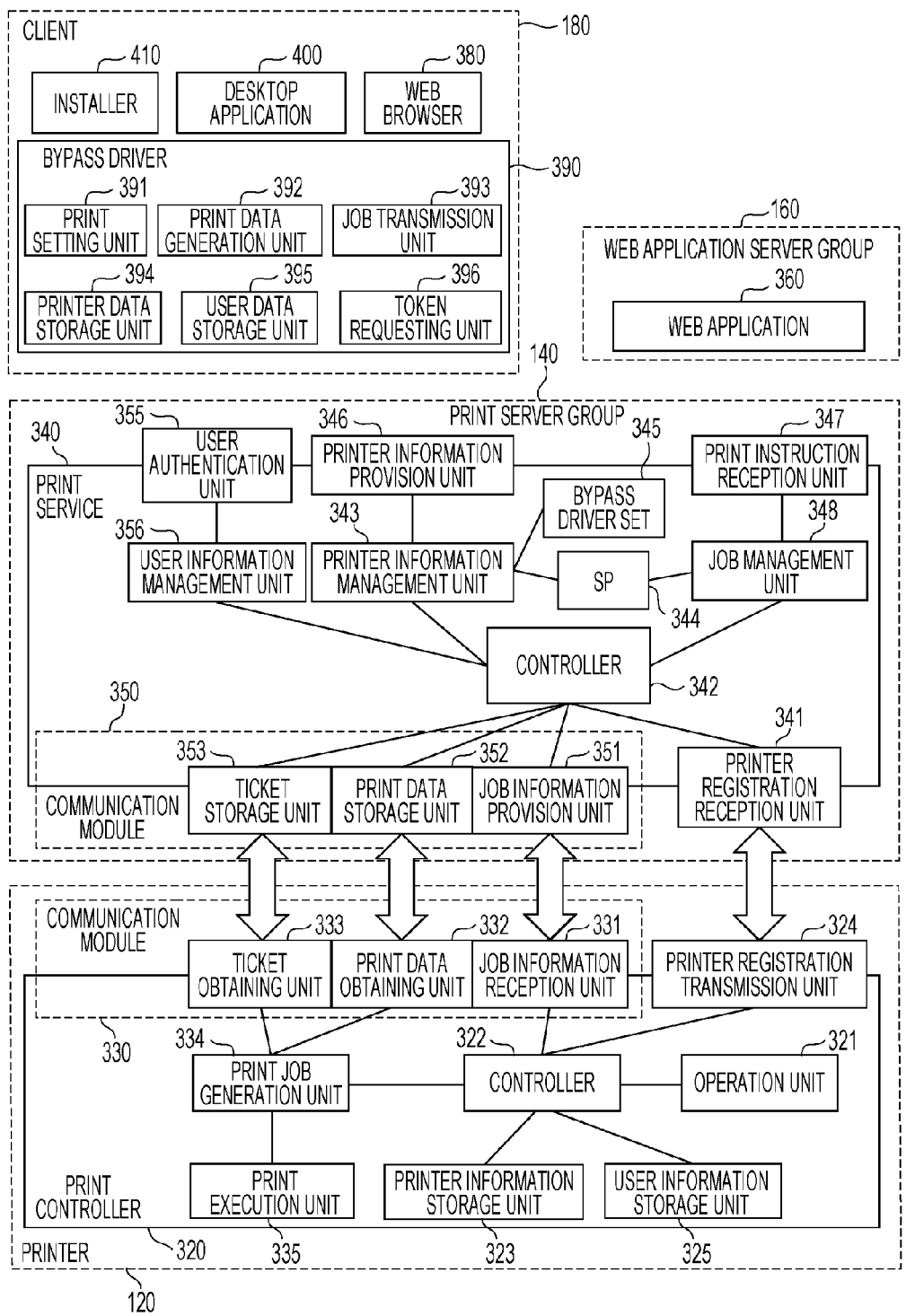
FIG. 3 is a diagram illustrating a software configuration of each of the apparatuses and the server groups included in the content data printing system.

Next, a software configuration of the apparatuses and the server groups included in the content data printing system 1000 will be described. FIG. 3 is a diagram illustrating a software configuration of each of the apparatuses and the server groups included in the content data printing system 1000. Programs which realize functions of the software configuration illustrated in FIG. 3 are stored in the ROM 203 of each of the apparatuses and the server groups. When the CPU 202 loads the programs into the RAM 204 and executes the programs, the functions are realized.

Hereinafter, functions realized by the information processing apparatuses and the server groups will be described. The description of functions is roughly divided into two parts, that is, the first half and the second half. In the first half, a basic printing function of performing printing by a printer registered in the print service using a web application will be described. In the second half, an advanced printing function, which is a developed basic printing function, of performing printing by a printer registered in the print service using a desktop application will be described, and this function is a unique technique of the present invention.

In the basic printing function described in the first half, as a feature, a printer is registered in the print service first and a user selects the registered printer when printing is to be performed using a web application. The web application registers a job in the print service in accordance with an interface provided by the print service. The printer obtains the job in accordance with the interface provided by the print service for printing. On the other hand, in the advanced printing function described in the second half, as a feature, a bypass driver receives a print instruction from a desktop application, generates a job acceptable by the print service, and registers the job in the print service for execution of printing. The bypass driver is installed in a client PC when an installation instruction is issued on a screen displayed by the print service. When the user desires to perform printing using a desktop application, as with selection of a normal printer driver, the bypass driver is selected in a printer selection screen displayed when a print button displayed by the application is pressed.

As the first half, the basic printing function will now be described. The basic printing function is further divided into two functions. As a function classified into a first system, that is, a printer registration system, the printer 120 is registered in a print service 340. As a function classified into a second system, that is, a printing system, print data generated by the print server group 140 is printed by the printer 120.

Figure 4A:
FIG. 4A is a diagram illustrating a user interface of a screen for registering a printer to print service displayed by the printer.

First, the function of the printer registration system, that is, the first system, will be described with reference to FIG. 3. First, operation of the printer 120 will be described. The printer 120 includes a print controller 320. The print controller 320 accepts a registration request so that the printer 120 becomes available in the print service 340. An operation unit 321 displays various operation screens. In this embodiment, a user interface (UI) illustrated in FIG. 4A is displayed, for example. The user may issue an instruction for registering the printer 120 in the print service 340 using the UI. Here, a URL of the print service 340 may be input. In a first embodiment, a URL corresponding to a value internally recorded is used, for example. In this screen, when a user ID 411 and a password 412 are input for logging in the print service 340 and a registration execution button 413 is pressed, the operation unit 321 issues an instruction for registration operation to a controller 322. The controller 322 obtains printer registration information used for the registration from a printer information storage unit 323.

The registration information includes a real printer ID (RPID) which is unique identification information assigned to the printer 120. Each of printers including the printer 120 has unique identification information assigned thereto, and each of the printers is specified by the identification information. As the unique identification information, a Mac address, for example, may be used. However, the unique identification information is not limited to this. The registration information further includes a printer name of the printer 120. The printer name is a name assigned to the printer 120 and is used when the printer 120 is identified. Unlike the identification information, printer names of the printers may be the same. The registration information further includes capabilities. The term "capabilities" represents information on printing functions of the printer including information whether the printer 120 is capable of performing duplex printing, information whether the printer 120 is capable of performing color printing, and information on a paper size which can be output.

The capabilities may be described by an XML format as illustrated in (a) of FIG. 5. Items <Item> represent capabilities of the printer 120. According to the items, the printer 120 is capable of performing duplex printing, performing color printing, and outputting sheets of a B5 size, an A4 size, and an A3 size. The registration information further includes a ticket initial value. As illustrated in (b) of FIG. 5, the ticket initial value may be described by the XML format and is a subset of the capabilities illustrated in (a) of FIG. 5. One of the items <Item> is selected in each of the functions. In an example of (b) of FIG. 5, one-side printing, color printing, and an A4 size are set. FIG. 6A is a diagram illustrating information stored in the printer information storage unit 323. An RPID is denoted by a reference numeral 611, a printer name is denoted by a reference numeral 612, capabilities are denoted by a reference numeral 613, and a ticket initial value is denoted by a reference numeral 614. An SPID denoted by a reference numeral 615 will be described hereinafter.

The controller 322 supplies printer registration information obtained from the printer information storage unit 323 and login information obtained from the operation unit 321 to a printer registration transmission unit 324 so as to instruct the printer registration transmission unit 324 to perform a printer registration process. The printer registration transmission unit 324 logs in the print service 340 using the received login information. When the login is successfully performed, a session is maintained between the printer 120 and the print service 340 using an account of a logged-in user unless otherwise noted.

Next, the printer registration transmission unit 324 transmits a printer registration request to the print service 340 in accordance with the received registration information. Here, (d) of FIG. 5 is a diagram illustrating information on a printer registration request supplied to the print service 340. The information described by the XML includes a printer name 541, an RPID 542, capabilities 543, and a ticket 544. The print controller 320 included in the printer 120 has been described hereinabove.

Next, operation of the print server group 140 will be described. The print server group 140 includes the print service 340. The print service 340 accepts a request for registering a printer and generates a service printer selectable by an application. A printer registration reception unit 341 transmits registration information to a controller 342 when receiving a printer registration request and the registration information from the printer registration transmission unit 324. The controller 342 transmits the registration information to a printer information management unit 343 so as to instruct the printer information management unit 343 to perform registration of a printer.

The printer information management unit 343 generates a service printer (SP) 344 corresponding to the printer which is requested to be registered in accordance with the obtained registration information and issues a unique identification ID (SPID) corresponding to the service printer. The service printer 344 (hereinafter referred to as an "SP 344") is uniquely generated for each printer and for each user account. Accordingly, different service printers 344 are generated for the same actual printer when different users individually perform registration. Furthermore, the SPID is used by the print service 340 to identify a target printer when the printer of the print service 340 is selected for printing. In other words, the service printer is a printer object and an aggregation of information which enables the user to identify the printer 120 in the print server group 140. The print server group 140 may offer printer information using information on the service printer and communicate with the printer 120. Although the SP 344 may be logically recognized as an independent printer, the SP 344 may be an entity as implementation and may not be an entity but a process of a program.

The printer information management unit 343 stores a user ID, an SPID, a printer name, capabilities, and a ticket which are associated with one another. FIG. 6B is a diagram illustrating information stored in the printer information management unit 343. An SPID is denoted by a reference numeral 621, a printer name is denoted by a reference numeral 622, an RPID is denoted by a reference numeral 623, capabilities are denoted by a reference numeral 624, and a ticket initial value is denoted by a reference numeral 625. Furthermore, information on a user who has registered a printer is stored as a printer owner 626.

An SPID issued by the printer information management unit 343 is transmitted to the printer registration transmission unit 324 through the controller 342 and the printer registration reception unit 341. The printer registration transmission unit 324 receives the SPID from the print service 340 as a response for the registration request. Here, (e) of FIG. 5 is a diagram illustrating the received SPID described by the XML and an SPID 551 corresponding to a printer is assigned. The printer registration transmission unit 324 transmits the received SPID to the controller 322 which transmits the information to the printer information storage unit 323. The printer information storage unit 323 stores the SPID associated with printer information. The SPID 615 illustrated in FIG. 6A represents a state in which the SPID 615 is stored while being associated with the printer information. The print service 340 included in the print server group 140 has been described hereinabove.

Figure 8:
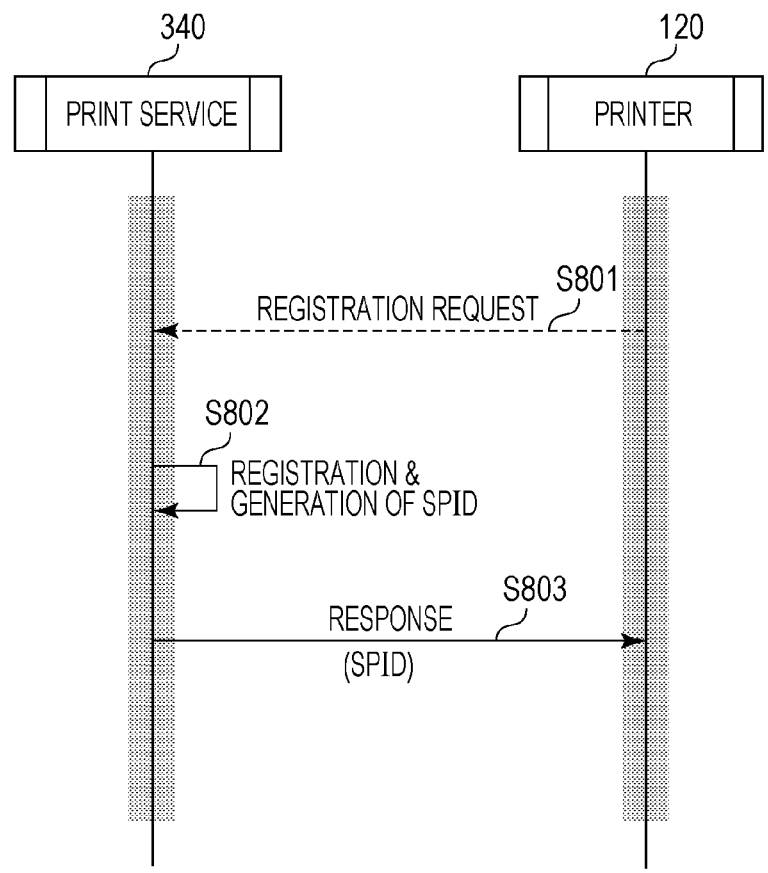
FIG. 8 is a sequence diagram illustrating a flow of registration of the printer to the print service according to the first embodiment.

Next, a processing flow of the printer registration system, that is, the first system, will be described with reference to a flowchart of FIG. 8. First, in step S801, the printer 120 issues a registration request to the print service 340. Here, a printer registration request illustrated in (d) of FIG. 5 is transmitted from the printer registration transmission unit 324 to the printer registration reception unit 341 when a user's instruction is accepted in the screen of FIG. 4A. Subsequently, in step S802, a service printer is registered and an SPID is issued. Here, the printer information management unit 343 generates the SP 344, issues an SPID of the SP 344 which is stored in a printer management table illustrated in FIG. 6B together with printer registration information.

Then, in step S803, the print service 340 transmits the issued SPID together with a success response to the printer 120. Here, a printer registration response illustrated in (e) of FIG. 5 is transmitted from the printer registration reception unit 341 to the printer registration transmission unit 324. Thereafter, the printer 120 stores the received SPID in the printer information storage unit 323. The processing flow of the printer registration system, that is, the first system, has been described hereinabove. As a result, the printer 120 is registered in the print service 340, and consequently, the SPID which is available for the print service 340 is issued.

Second, the function of the printing system, that is, the second system, will be described with reference to FIG. 3. Functions of the client 180 will now be described. The client 180 includes a web browser 380. The web browser 380 transmits an instruction for printing content data stored in the web application server group 160 to the web application server group 160. Furthermore, the web browser 380 receives an instruction for accessing the print server group 140, that is, a redirection instruction, from the web application server group 160 and accesses the print server group 140 in accordance with the received redirection instruction.

Figure 4B:
FIG. 4B is a diagram illustrating a user interface of a print setting screen displayed by the print service.

Moreover, the web browser 380 obtains and displays a list of printers which are usable by a user who uses the web browser 380 for printing and a print setting screen for one of the printers. FIG. 4B is a diagram illustrating the print setting screen displayed by the web browser 380. Furthermore, the web browser 380 transmits information on a printer and a print setting value which are set by the user in the print setting screen to the print server group 140. The web browser 380 included in the client 180 has been described hereinabove.

Next, functions of the web application server group 160 will be described. The web application server group 160 includes a web application 360. The web application 360 provides document generation service. When the user desires to distribute materials in a company meeting, the user uses the document generation service for generating the materials. When the client 180 uses the web application 360, the application is not required to be installed in the client 180 but the client 180 only has the web browser 380. The web application 360 transmits screen information for generating the materials to the web browser 380. FIG. 4C is a diagram illustrating a user authentication screen. When a user ID 431 and a password 432 are filled and a login button 433 is pressed, an authentication process is started. The web application 360 performs authentication in accordance with user information including the user ID and the password input by the user through the web browser 380 and transmits screen information used to generate the materials when the authentication is successfully performed. The web browser 380 which has received the screen information displays a generation screen for generating documents in accordance with the screen information. The user generates materials to be distributed in the meeting using the generation screen. The web application 360 receives information on the materials generated by the user using the generation screen, generates content data in accordance with the received information, and causes a storage device included in the web application server group 160 to store the generated content data. The web application 360 provides mail service and schedule service in addition to the document generation service.

A user who desires to print the content data generated using the document generation service presses a print button displayed in the generation screen (not illustrated). When receiving information on the fact that the print button has been pressed, the web application 360 transmits an instruction for accessing the print server group 140, that is, a redirection instruction, to the web browser 380. The redirection instruction includes a request for obtaining a list corresponding to the user described above who uses the web browser 380, content-data identification information for identifying the content data which is instructed to be printed by the user, and user information. Furthermore, when the print server group 140 issues a request for obtaining the content data, the web application 360 transmits the content data to the print server group 140 in accordance with the content-data identification information used for identifying the content data transmitted with the obtainment request. The web application 360 may transmit a request for obtaining the list corresponding to the user after directly making inquiry to the print server group 140 without using the web browser 380. The web application 360 included in the web application server group 160 has been described hereinabove. The content data is not limited to document data and the content data may be image data and form data.

Next, functions of the print server 340 will be described. The print service 340 obtains print data from the web application 360 and stores the print data therein. Furthermore, the print service 340 transmits a print job to a printer through a network in response to a job obtainment request supplied from the printer. The print service 340 includes a printer information provision unit 346. The printer information provision unit 346 transmits a printer list to the web browser 380 when receiving a printer list obtainment request from the web browser 380. Here, the printer information provision unit 346 specifies SPIDs and printer names from the printer management table illustrated in FIG. 6B which is stored in the printer information management unit 343 in accordance with user information. Then the printer information provision unit 346 generates a list of printers which are available for the user in accordance with the SPIDs and the printer names.

Furthermore, the printer information provision unit 346 receives an SPID of a printer selected by the user from the printer list. The printer information provision unit 346 specifies capabilities stored in the printer information management unit 343 in accordance with the received SPID, generates a print setting screen, and transmits the generated print setting screen to the web browser 380. Moreover, the printer information provision unit 346 specifies a ticket initial value stored in the printer information management unit 343 in accordance with the received SPID and sets the ticket initial value as an initial value of a print setting. The printer information management unit 343 generates the print setting screen in accordance with information on the capabilities illustrated in (a) of FIG. 5. As illustrated in FIG. 4B, only print settings described as the capabilities are displayed in the print setting screen as various functions 421.

A print instruction reception unit 347 receives a ticket and an SPID set in the print setting screen from the web browser 380. The ticket and the content data may be represented by locations (such as URLs) instead of entities. In this case, files are obtained from the locations where appropriate. When the web browser 380 makes access in accordance with the redirection instruction issued by the web application 360, the print instruction reception unit 347 receives content-data identification information for identifying content data instructed to be printed by the user. When receiving the content-data identification information, the print instruction reception unit 347 obtains content data which is a printing target from the web application 360 in accordance with the received content-data identification information. The received or obtained content data, the received or obtained ticket, and the received or obtained SPID are stored in a job management unit 348 after being associated with the user information. Here, the ticket is described in an XML format as illustrated in (c) of FIG. 5. As illustrated in (c) of FIG. 5, the user sets duplex printing, monochrome printing, and a sheet size of A4. The job management unit 348 may convert the obtained content data into print data where appropriate. Furthermore, the job management unit 348 instructs the SP 344 corresponding to the obtained SPID to spool an obtained job. If the SP 344 is an entity, each SP may perform a spooling process and an entire job may be managed by a table.

The controller 342 obtains the print data, the ticket, and the SPID from the job management unit 348. A communication module 350 is capable of communicating with the printer 120 including a communication module 330 and serves as an interface used for data communication between the communication module 350 and the communication module 330. The communication module 350 includes a print data storage unit 352, a ticket storage unit 353, and a job information provision unit 351. The print data storage unit 352 receives print data from the controller 342 and stores the print data therein. The ticket storage unit 353 receives the print setting from the controller 342 and stores the print setting therein. When receiving information on completion of the storage from the print data storage unit 352 and the ticket storage unit 353, the controller 342 instructs the job management unit 348 to store information on a job. FIG. 6C is a diagram illustrating job information stored in the job management unit 348. A job ID is denoted by a reference numeral 631, a job name is denoted by a reference numeral 632, an SPID is denoted by a reference numeral 633, a ticket is denoted by a reference numeral 634, a storage location of print data (such as a URL) is denoted by a reference numeral 635, and a storage location of the ticket is denoted by a reference numeral 636. The ticket 634 is the same as the ticket stored in the ticket storage location 636, and therefore, the ticket 634 may be omitted. Here, the ticket is frequently used, and therefore, the ticket is directly stored in a management table so that the ticket may be conveniently used. As a job owner 637, information on a user who has issued an instruction for printing a job is stored. In the first embodiment, a single user issues instructions, and therefore, User X is stored as the job owner 637. As a status 638, a status of a job is stored. For example, "Queued" may be set in a state in which a job is stored in the print service, "Spooled" may be set in a state in which a job is downloaded from a printer, "Done" may be set in a state in which printing is normally performed, "Error" may be set in a state in which printing is not performed due to an error, and so on.

Next, the controller 342 instructs the job information provision unit 351 to transmit information. The job information provision unit 351 transmits notification information A representing a fact that print data is prepared to the printer 120. The notification information A may be described in the XML format as illustrated in (f) of FIG. 5. Here, only an SPID is transmitted since only the fact that a job is prepared is transmitted to a printer which performs outputting. The functions of the print service 340 have been described hereinabove.

Next, functions of the printer 120 will be described. The printer 120 obtains a job from the print service 340 and executes print output. A job information reception unit 331 issues a request for transmitting job information to the print service 340 when receiving the notification information A issued by the job information provision unit 351. By this request, a job spooled in the SP 344 is obtained from the SP 344 generated in accordance with the request for registering the printer 120. Therefore, the request for transmitting job information specifies an SPID using the SPID as a parameter as illustrated in (g) of FIG. 5. Although the SPID is managed by the table which is stored in the printer information storage unit 323 and which is illustrated in FIG. 6A, an SPID illustrated in (f) of FIG. 5 is used in this embodiment.

When receiving the job information request from the job information reception unit 331, the job information provision unit 351 checks the job management unit 348 and extracts information on a job associated with the obtained SPID so as to generate notification information B. When taking the job illustrated in FIG. 6C as an example, information used to generate the notification information B includes the job ID 631, the job name 632, the print data storage location 635, and the ticket storage location 636. In accordance with the information, the notification information B is generated in an XML format as illustrated in (h) of FIG. 5. The information includes a job ID 561, a job name 562, a print data storage location 563, and a ticket storage location 564. After the notification information B is generated, the job information provision unit 351 transmits the notification information B to the printer 120.

When receiving the notification information B, the job information reception unit 331 checks a location where print data is stored and a location where a ticket is stored which are described in the notification information B and notifies a print data obtaining unit 332 and a ticket obtaining unit 333 of information on the locations. The print data obtaining unit 332 obtains print data from the print data storage unit 352 in accordance with the notified location where the print data is stored. Furthermore, the ticket obtaining unit 333 obtains the ticket from the ticket storage unit 353 in accordance with the notified location where the ticket is stored. After the obtainment is completed, the controller 322 instructs a print job generation unit 334 to generate a print job. The print job generation unit 334 receives the print data from the print data obtaining unit 332, receives the ticket from the ticket obtaining unit 333, and generates a print job in accordance with a print setting of the ticket. After generating the print job, the print job generation unit 334 transmits the print job to a print execution unit 335 and output is performed from a print unit.

The processing flow until printing is performed by the printer 120 has been described hereinabove.

Figure 9:
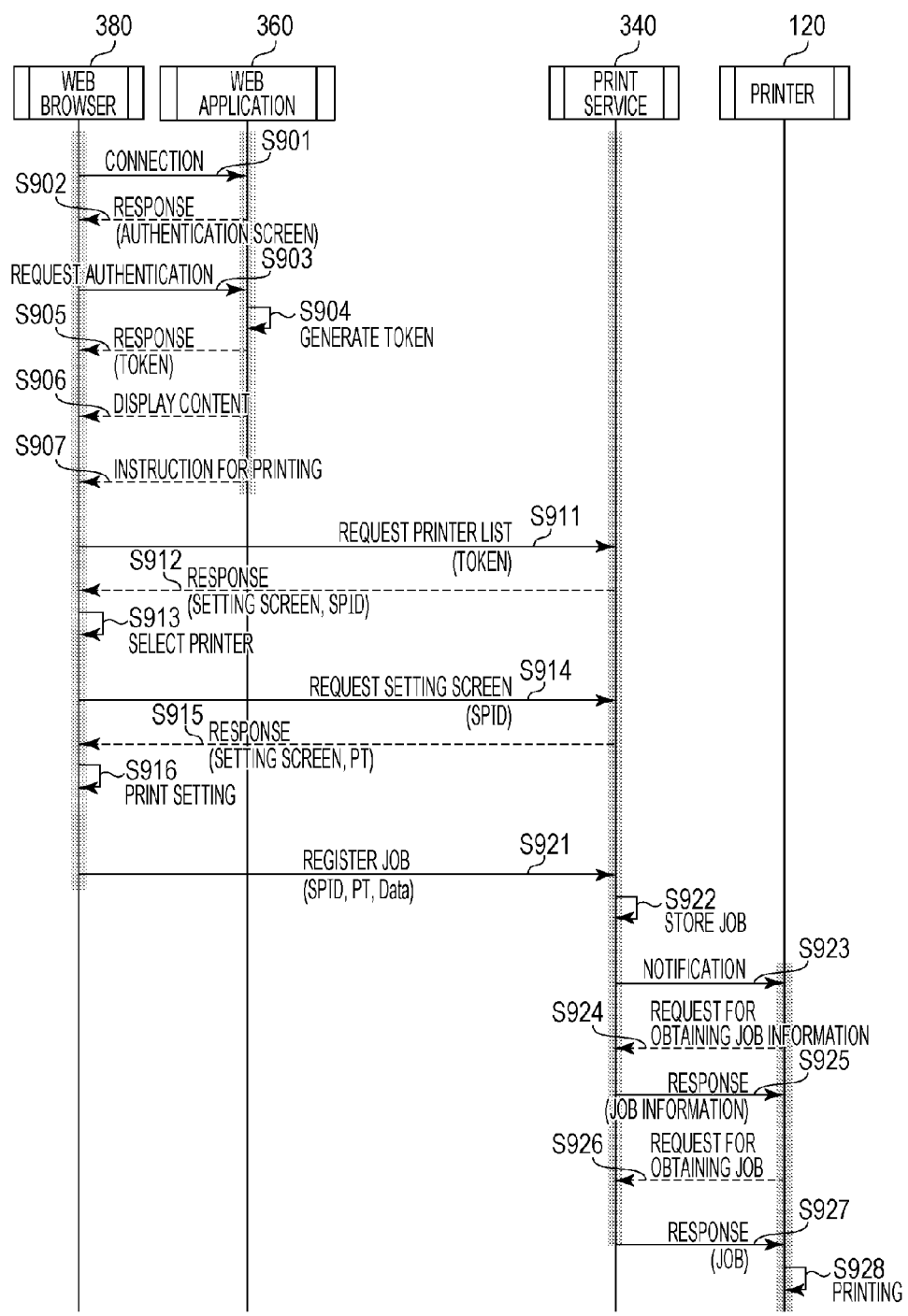
FIG. 9 is a sequence diagram illustrating a flow of printing performed from a web application through the print service according to the first embodiment.

Next, a processing flow of the printing system, that is, the second system, will be described with reference to a flowchart of FIG. 9. In step S901, the web browser 380 is connected to the web application 360. In step S902, the web application 360 sends back an authentication screen as a response. The web browser 380 displays the authentication screen as illustrated in FIG. 4C and transmits authentication information input by the user to the web application 360 in step S903. In step S904, the web application 360 checks validity of the authentication information and issues an access token if the authentication information is valid. In step S905, the web application 360 transmits the access token together with a success response to the web browser 380. After that, the access token becomes usable when a session is established where appropriate. The access token is data issued when user's authority for using service to be accessed is transferred to a device which is an access source or to an application which accesses the service. The service to be accessed provides service without requesting the user to transmit authentication information when a device or an application which transmits the access token accesses the service. The user does not input authentication information every time the device or the application accesses the service, and accordingly, high user-friendliness is realized. Data representing a fact that user's authority has been transferred, such as the access token, is referred to as "authority information".

Note that the access token which is an example of the authority information may be issued by an authentication server system (not illustrated). In the following description, if an expression "an access token is generated" is described, the access token may be issued by an authentication server system. In this case, the authentication server system may issue the access token and a refresh token used to reissue the access token. The access token and the refresh token have expiration dates and the access token is expired before the refresh token is expired.

Furthermore, only apparatuses which transmit authentication information registered in the authentication server system may use authentication service in which the access token is issued. After the authentication is completed, the web application 360 transmits content data to be displayed to the web browser 380 and permits the user to edit the content data. Furthermore, when the user performs a print instruction using the web application 360, the web application 360 transmits, to the web browser 380, an instruction for redirecting a request for transmitting a printer list to the print service 340 in step S907.

In step S911, the web browser 380 transmits the printer list request to the print service 340 in accordance with the redirection instruction. Note that, if the print service 340 is provided by a vendor the same as a vendor which provides the web application 360, the access token described above is usable for connection and additional user authentication is not required. Furthermore, if the print service 340 is provided by a vendor which is not the same as a vendor which provides the web application 360 but a vendor which has a partnership with the vendor of the web application 360, the access token may be commonly used. If the access token has not issued or is expired, the user authentication is performed again. Subsequently, the print service 340 generates printer list information (SPID list information) and sends back the printer list information to the web browser 380 in step S912. In step S913, the web browser 380 displays a printer list screen and accepts selection of a printer.

In step S914, the web browser 380 transmits an SPID of the selected printer to the print service 340. When receiving the SPID, the print service 340 obtains corresponding capabilities and a corresponding ticket from the printer management table illustrated in FIG. 6B and generates the print setting screen including the functions 421 as illustrated in FIG. 4B. In step S915, the print service 340 transmits the print setting screen and information on the ticket to the web browser 380. In step S916, the web browser 380 displays the print setting screen and accepts change of the print setting performed by the user.

In step S921, the web browser 380 transmits a job registration request to the print service 340. Here, print data (content data), the ticket, and the SPID are transmitted. In step S922, the job management unit 348 of the print service 340 stores the received information in the job management table illustrated in FIG. 6C. In step S923, the job information provision unit 351 of the print service 340 transmits notification information A illustrated in (f) of FIG. 5 to the job information reception unit 331 of the printer 120. In step S924, the job information reception unit 331 transmits a job information obtaining request illustrated in (g) of FIG. 5 to the job information provision unit 351. In step S925, the job information provision unit 351 returns job information (notification information B) illustrated in (h) of FIG. 5 to the job information reception unit 331.

In step S926, the print data obtaining unit 332 and the ticket obtaining unit 333 included in the printer 120 transmit a job information obtaining request to the print service 340. In step S927, job information stored in the print data storage unit 352 and the ticket storage unit 353 included in the print service 340 is transmitted to the printer 120. In step S928, the print execution unit 335 of the printer 120 outputs printed material. The processing flow of the printing system, that is, the second system, has been described hereinabove. As a result, since a job is registered in the print service 340 using the web application 360, printing can be performed by a printer managed by the print service 340. The first half of the first embodiment has been described. In the second half below, the basic printing function described in the first half is developed, and an advanced printing function using a desktop application through cloud printing service will be described.

In the basic functions described in the first half, printing using a web application is target printing. This is because an interface for transmitting a printing request to the print service is used through a web application. However, it is inconvenient if printing is not performed by printers managed by print service using desktop applications which are still in the mainstream. In particular, when printing is performed using a desktop application, a device driver is mainly used, and therefore, there is a demand for printing performed through print service using a device driver. Accordingly, realization of printing performed through the print service using a desktop application by means of functions of a bypass driver, that is, a virtual printer driver described below, will now be described. First, functions of the bypass driver will be briefly described.

As with normal printer drivers, the bypass driver includes an interface for receiving a print request from a desktop application. The bypass driver further includes an interface for being connected to the print service and registering a job to the print service. In general, the printer driver converts a print instruction (including content data and a print setting) received from an application into print data in a format which can be interpreted by a printer and transmits the print data to the printer. The bypass driver converts the print instruction received from the application into print data in a format which can be interpreted by the print service and registers the print data in the print service together with a ticket including a print setting. As with reception from a web application, the print service stores a job received from the bypass driver and causes the printer to obtain the job for printing. The bypass driver may transmit the print instruction received from the application without performing the conversion. The functions of the bypass driver have been described hereinabove.

As the second half, the advanced printing function will now be described. The advanced printing function is further divided into two functions. As a function classified into a first system, that is, a driver installation system, a bypass driver 390 is installed in the client 180. As a function classified into a second system, that is, a printing system, print data generated by a desktop application 400 is registered in the print service 340 and printed by a printer managed by the print service 340. First, the function of the driver installation system, that is, the first system, will be described with reference to the configuration diagram illustrated in FIG. 3 and a flowchart illustrated in FIG. 10. A flow of a process of connection from the web browser 380 to the print service 340 in response to an instruction issued by a user to the web browser 380 will now be described.

In step S1001, the web browser 380 transmits a connection request to the print service 340. In step S1002, a user authentication unit 355 of the print service 340 transmits an authentication screen illustrated in FIG. 4C as a response to the connection request. The web browser 380 displays the received authentication screen and accepts input of the user ID 431 and the password 432 and press of the login button 433. When the login button 433 is pressed, the web browser 380 transmits the input information to the print service 340 and requests authentication in step S1003. In step S1004, the user authentication unit 355 of the print service 340 instructs a user information management unit 356 to check validity of the received authentication information and issues an access token when it is determined that the authentication information is valid. In step S1005, the issued access token is transmitted from the user authentication unit 355 to the web browser 380 together with a success response. By this, a session is established between the web browser 380 and the print service 340. Furthermore, if a session is to be re-established from the web browser 380 to the print service 340, a step of inputting information on the user authentication may be omitted when the obtained access token is used.

Next, in step S1006, the web browser 380 transmits a request for displaying a printer list screen to the print service 340. In step S1007, the printer information provision unit 346 which has received the request obtains printer information associated with an account of the connected user from the management table illustrated in FIG. 6B and generates a printer list screen illustrated in FIG. 4D. In step S1008, when receiving the printer list screen together with a response, the web browser 380 displays the printer list screen and accepts a user input. Here, printers 441 illustrated in FIG. 4D are included in a printer list and installation buttons 442 are used to issue a request for installing a bypass driver. When one of the installation buttons 442 is pressed, the web browser 380 transmits a request for installing a bypass driver and an SPID of a target printer to the print service 340 in step S1011.

In step S1012, when receiving the installation request and the SPID, the printer information provision unit 346 obtains information on generation of an installation set of the specified printer. Printer unique information includes three items, that is, capabilities representing performance of a printer, a ticket representing a print setting, and an SPID specifying a service printer. The three items may be obtained from information managed by the printer management table illustrated in FIG. 6B. The capabilities are obtained from the capabilities 624, the ticket is obtained from the ticket initial value 625, and the SPID is obtained from an SPID 621. Subsequently, an installation set used for installation of a bypass driver is generated in step S1013.

Figure 7A:
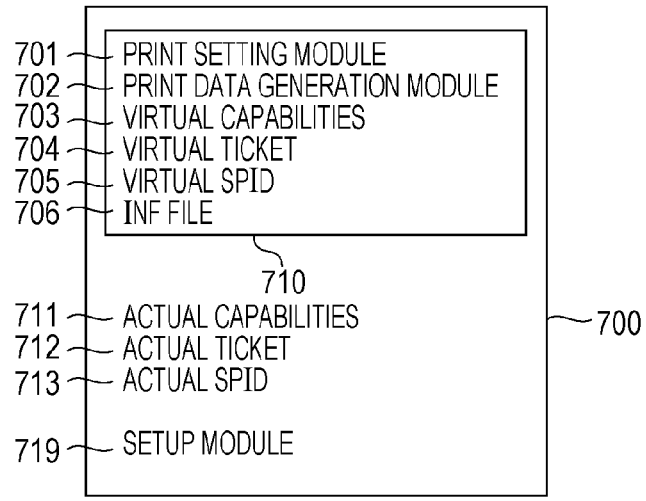
FIG. 7A is a diagram illustrating a configuration of an installation set according to a first embodiment.

FIG. 7A is a configuration diagram illustrating modules and files included in an installation set 700. The installation set 700 includes a driver set 710, data for updating, and a setup module 719. The driver set 710 is a set of a smallest number of modules and a smallest number of files to be installed as a printer driver. Use of the driver set enables installation of a printer driver using a function of an OS. Furthermore, use of a function of a setup module described below enables higher-accuracy installation. The driver set 710 includes a print setting module 701, a print data generation module 702, virtual capabilities 703, a virtual ticket 704, a virtual SPID 705, and an INF file 706. The print setting module 701 is used to display a print setting screen in response to a print setting request supplied from a desktop application and performs a print setting in accordance with a user's instruction. The print data generation module 702 generates print data in accordance with a print request supplied from an application and outputs the print data.

The virtual capabilities 703, the virtual ticket 704, and the virtual SPID 705 are dummy information of capabilities, a ticket, and an SPID, respectively, and have fixed values. The INF file 706 includes description of a configuration of the bypass driver including the modules and the information described above. According to the INF file 706, the bypass driver is installed with this configuration. Furthermore, the installation set 700 includes actual capabilities 711, an actual ticket 712, and an actual SPID 713 which are data for updating. These are data having actual information and used for data updating after the driver set 710 is installed. The information obtained in step S1012 is assigned to the actual capabilities 711, the actual ticket 712, and the actual SPID 713. In addition, the installation set 700 includes the setup module 719. The setup module 719 performs a series of installation processes and is independent from a printer and a user account. The setup module 719 first installs the driver set 710, and after the installation is completed, the setup module 719 further instructs rewriting by data for updating.

The installation set 700 is generated by the information, the modules, and the files obtained as described above.

In step S1014, the printer information provision unit 346 transmits the generated installation set 700 and an instruction for activating the installation set 700 to the web browser 380. The installation set 700 received by the web browser 380 is configured as an installer 410 in the client 180.

In step S1021, the web browser 380 instructs the installer 410 to activate a setup in accordance with the activation instruction. The installer 410 activates the setup module 719 included in the installation set 700. In step S1022, the setup module 719 transmits a request for installing the driver set 710 to an OS of the client 180. In step S1023, a specified module, a specified file, and specified information of the driver set 710 are installed in the OS in accordance with the INF file 706. The installed driver set is configured as the bypass driver 390 in the client 180.

The bypass driver 390 includes a print setting unit 391, a print data generation unit 392, a job transmission unit 393, a printer data storage unit 394, a user data storage unit 395, and a token requesting unit 396. The print setting unit 391 corresponds to the print setting module 701 and has a function of performing a print setting. The print data generation unit 392 corresponds to the print data generation module 702 and has a function of generating print data. The job transmission unit 393 has a function of transmitting a generated job. The printer data storage unit 394 has a function of storing information on printers and stores the virtual capabilities 703, the virtual ticket 704, and the virtual SPID 705 therein. Here, the printer data storage unit 394 stores dummy information. Even when the client 180 is used by a plurality of users, information which is independent from the users is stored in the printer data storage unit 394, and therefore, only one data region is provided for each printer. The user data storage unit 395 has regions divided for individual user accounts which store information which depends on users. The token requesting unit 396 has a function of requesting an access token for connection to the print service 340. The token requesting unit 396 will be described in detail in a second embodiment.

Next, the setup module 719 updates data of the actual capabilities 711, the actual ticket 712, and the actual SPID 713 which are included in the installation set 700. In step S1024, the setup module 719 requests the printer data storage unit 394 of the bypass driver 390 to perform updating using the three data items. In step S1025, the printer data storage unit 394 rewrites existing data using the received data. By the steps described above, the capabilities, the ticket, and the SPID corresponding to an actual printer are set in the printer data storage unit 394. The processing flow of the driver installation system, that is, the first system, has been described hereinabove.

By the functions described above, the bypass driver for using the print service 340 is installed from a desktop application to a client only by press of an installation button corresponding to a printer performed by the user in the printer list screen illustrated in FIG. 4D. Furthermore, the bypass driver becomes usable without complicated processes including activation of a setup file and various settings.

Figure 11:
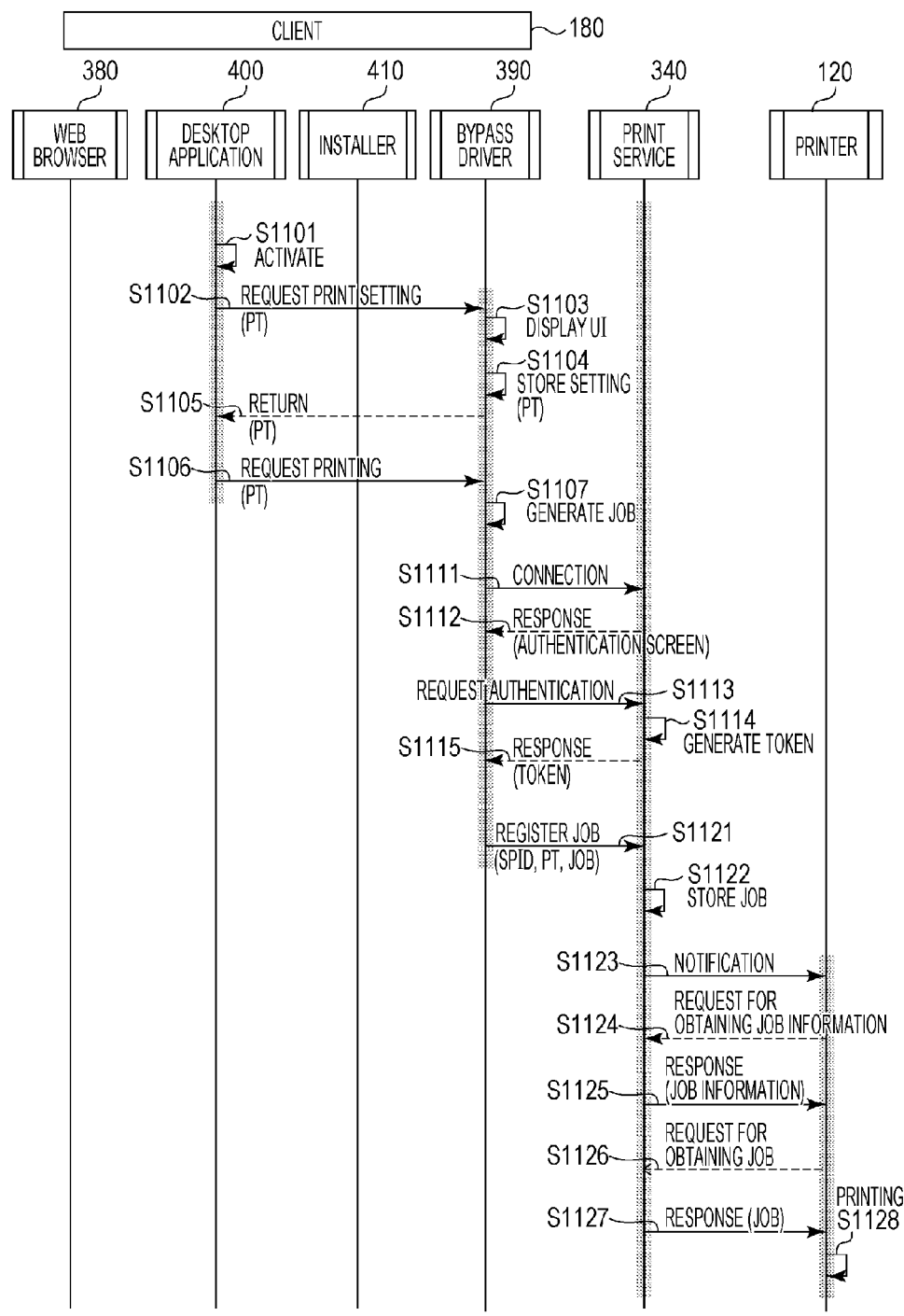
FIG. 11 is a sequence diagram illustrating a flow of printing performed from a desktop application through the print service according to the first embodiment.

Next, the function of the printing system, that is, the second system, will be described with reference to the configuration diagram illustrated in FIG. 3 and a flowchart illustrated in FIG. 11. The client 180 includes the desktop application 400. Here, a case where the user generates content data using the desktop application 400, instructs printing, and selects the bypass driver 390 of a target printer in the printer selection screen so as to activate the bypass driver 390, and thereafter, printing is performed is taken as an example.

In step S1101, first, the desktop application 400 is activated and content data is edited. When the user issues a request for print setting, the desktop application 400 transmits the print setting request and a ticket to the bypass driver 390 in step S1102. In step S1103, the print setting unit 391 of the bypass driver 390 displays the print setting screen illustrated in FIG. 4E. A configuration and a display method of the screen of FIG. 4E are basically the same as those of FIG. 4B. Specifically, the print setting unit 391 obtains capabilities stored at a time of installation from the printer data storage unit 394 and configures the print setting screen in accordance with capability information. Furthermore, the print setting unit 391 displays parameters included in the ticket obtained in step S1102 as initial values of a print setting. Next, in step S1104, the print setting unit 391 stores the parameters of the print setting input by the user in the ticket. When the user completes the input of the print setting, the print setting unit 391 returns information on the ticket to the desktop application 400 in step S1105.

When the user issues a request for printing, the desktop application 400 transmits the printing request, the content data, and the ticket to the bypass driver 390 in step S1106. In step S1107, the print data generation unit 392 of the bypass driver 390 converts the received content data into print data in a format (a PDF format or an XPS format) receivable by the print service 340. The received ticket and the print data generated by the print data generation unit 392 are transmitted to the job transmission unit 393. The content data may be transmitted to the job transmission unit 393 as print data without the conversion.

In step S1111, the job transmission unit 393 transmits a connection request to the print service 340. In step S1112, the user authentication unit 355 of the print service 340 transmits the authentication screen illustrated in FIG. 4C as a response to the connection request. The bypass driver 390 displays the received authentication screen and accepts input of the user ID 431 and the password 432 and press of the login button 433. When the login button 433 is pressed, the bypass driver 390 transmits the input information to the print service 340 and requests authentication in step S1113. The user authentication unit 355 of the print service 340 controls the user information management unit 356 and performs authentication in accordance with the received information. In step S1114, when the user authentication is successfully performed, the user information management unit 356 issues an access token. In step S1115, the issued access token is transmitted to the bypass driver 390 through the user authentication unit 355 together with a success response. By this, a session is established between the bypass driver 390 and the print service 340. If a session is to be reestablished from the bypass driver 390 to the print service 340, the step of authentication request may be omitted when the obtained access token is used. The bypass driver 390 may store the obtained access token in the printer data storage unit 394.

In step S1121, the job transmission unit 393 transmits a request for registering a job to the print service 340. Here, the print data, the ticket, and the SPID are transmitted. Thereafter, a process of printing a job received by the print service 340 is performed from step S1122 to step S1128. However, this process is totally the same as the process from step S922 to step S928 of FIG. 9 described in the basic printing function in the first half. Specifically, from the viewpoint of the print service 340, a process for the print request transmitted from the bypass driver 390 is performed which is not distinguished from the case where the print request is transmitted from the web application 360. The functions and the processing flow of the printing system, that is, the second system, has been described hereinabove.

By the functions described above, the user may perform printing by a printer managed by the print service 340 using the desktop application 400 by the same procedure as general printing performed by a printer without a special setting of a bypass driver.

Furthermore, the driver set 710 has a fixed configuration which is not changed irrespective of a printer and a user account. Some OS vendors issue a digital signature to driver sets which has passed an authentication test. Since the driver set 710 has the fixed configuration, the digital signature obtained with this configuration is valid in this embodiment. Accordingly, even in a system in which a client displays an alert representing that a signature is lacked at a time of installation, the alert may be avoided. Furthermore, since capabilities, a ticket, and an SPID which are unique for each printer are updated as updating information, driver installation for each apparatus is appropriately completed.

Figure 7B:
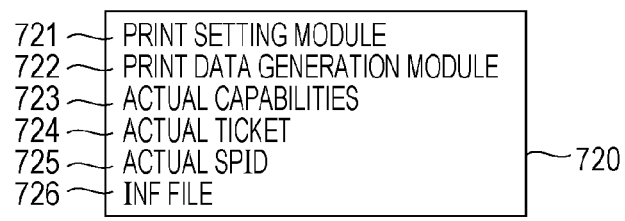
FIG. 7B is a diagram illustrating a configuration of a driver set according to the first embodiment.

In this embodiment, an embodied form of the installation set (a driver set, actual data, and a setup tool) has been described. However, in an environment in which a digital signature is not required, a driver set including actual printer information may be used instead of the installation set. FIG. 7B is a configuration diagram in a case where a driver set is used instead of the installation set. A driver set 720 includes the following files. First, a print setting module 721, a print data generation module 722, and an INF file 726 are the same as those of the driver set 710. Next, actual capabilities 723, an actual ticket 724, and an actual SPID 725 are not dummies but obtained from FIG. 6B. They are the same as the actual capabilities 711, the actual ticket 712, and the actual SPID 713. When this configuration is employed, in step S1021 of FIG. 10, installation is executed by an instruction for installing a driver directly issued to the OS instead of activation of setup. Since actual data is installed in this step, the updating step in step S1024 and step S1025 is not performed.

Second Embodiment

In the first embodiment, obtainment of an access token is required when printing is performed for the first time or every time printing is performed, and therefore, it may be inconvenient for users. Accordingly, an access token may be included as data of an installation set or a driver set together with capabilities, a ticket, and an SPID and stored at a time of installation. In this case, an access token used when access is made for the installation request in step S1011 (which has been issued in step S1004) is obtained at the time of the data obtainment in step S1012 of FIG. 10 and is included in the installation set at the time of the generation of the installation set in step S1013. Specifically, since the access token is included in the installation set before the bypass driver is distributed to the client 180, the print service 340 may be critically utilized after the installation of the bypass driver.

However, in the authentication information of the first embodiment, an access token is issued at a time when a user is authenticated, and it is possible that security is not sufficient in a process of transfer of authority. Accordingly, in the second embodiment, a function of transferring authority for accessing print service 340 to a bypass driver 390 by means of an approved cooperation function referred to as "OAuth" will be described. Configurations and flows in portions not described are the same as those of the first embodiment in principle.

Figure 12:
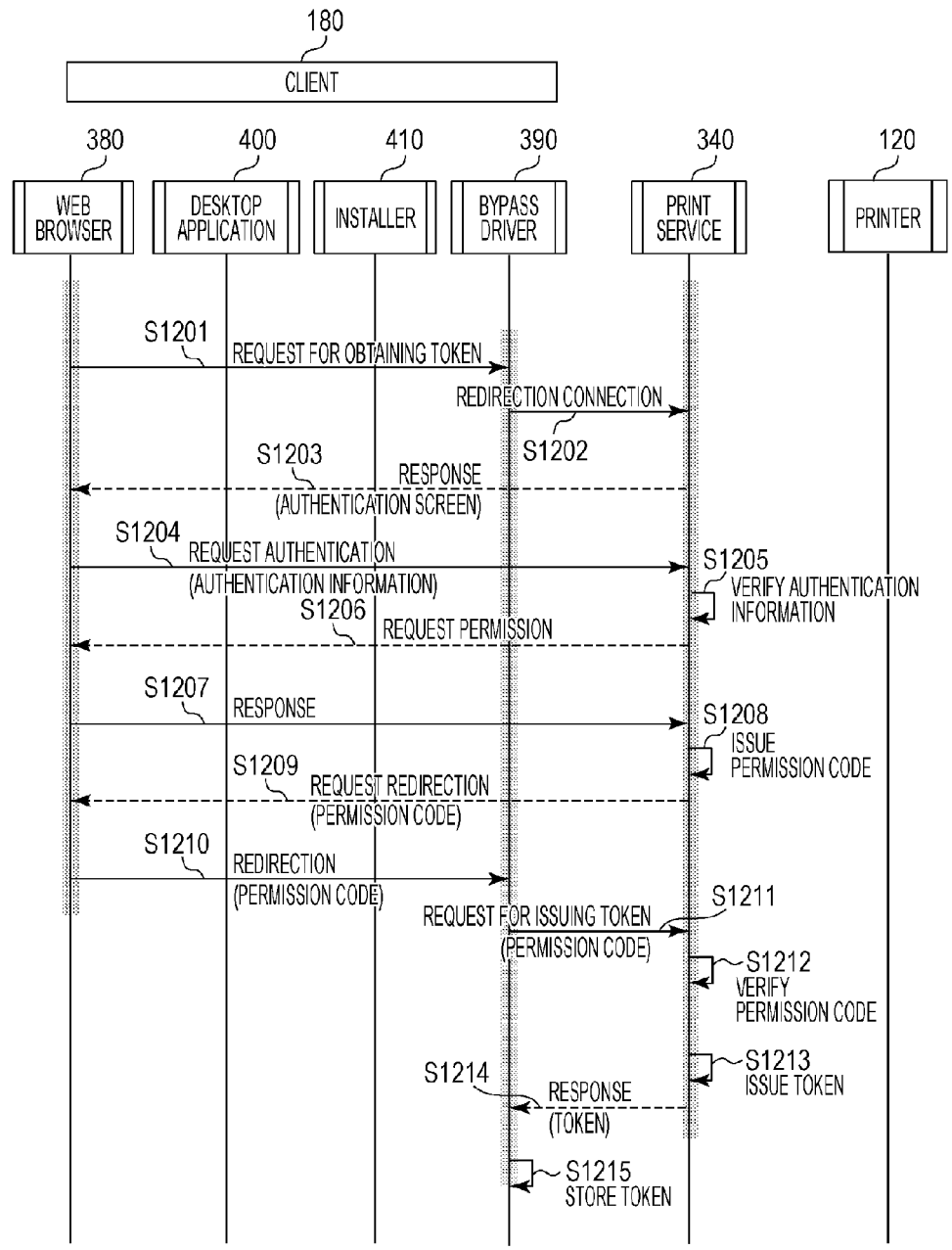
FIG. 12 is a sequence diagram illustrating a flow of transfer of authority to a bypass driver according to a second embodiment.

Here, a function of obtaining an access token from the print service 340 and receiving the access token by the bypass driver 390 will be described with reference to the configuration diagram illustrated in FIG. 3 and a flowchart illustrated in FIG. 12. As with the first embodiment, the description will be made provided that the print service 340 issues an access token. However, a redirection destination in step S1202 described below may correspond to an authentication server system which provides authentication service and the authentication service may issue an access token.

Figure 10:
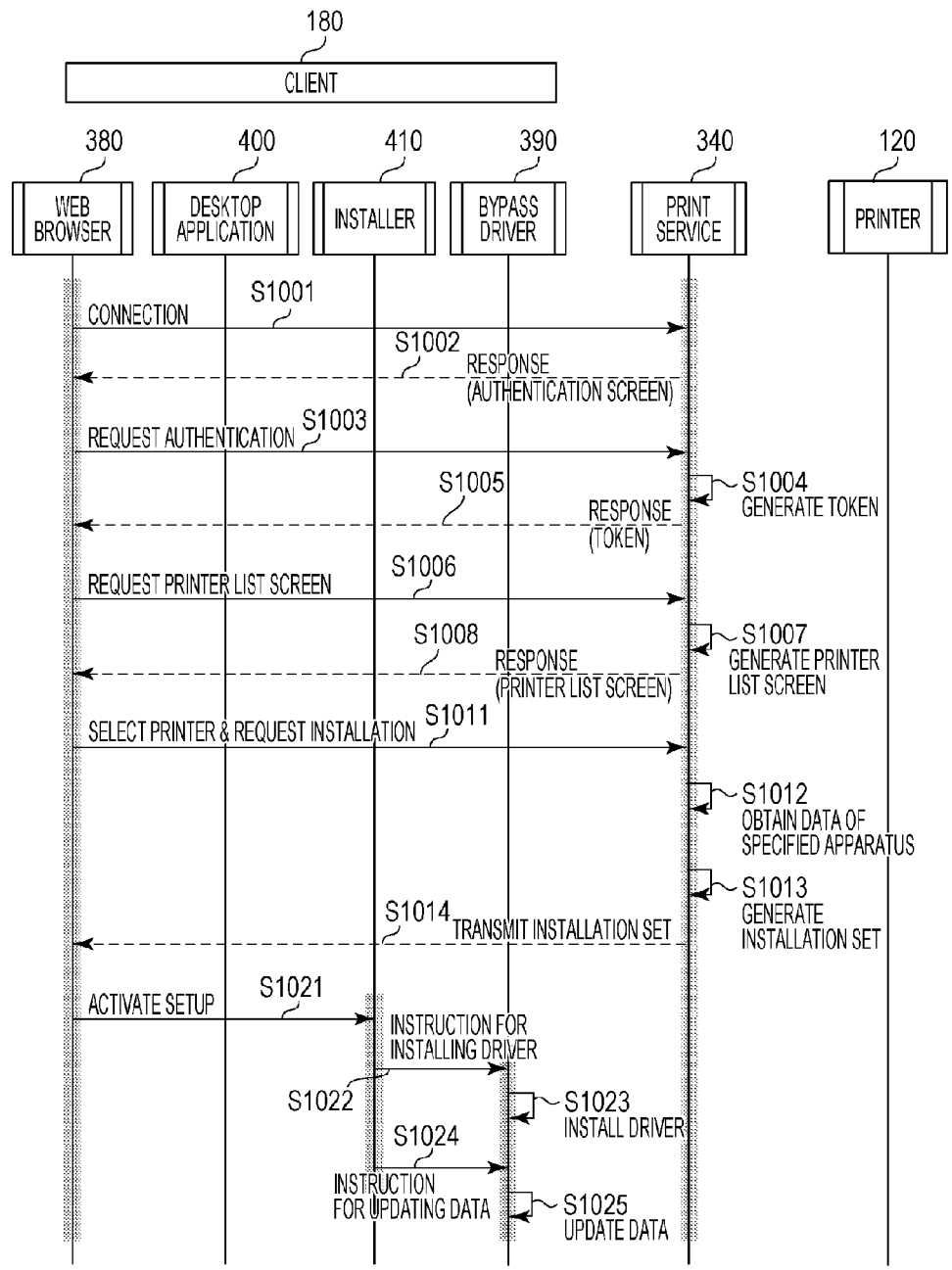
FIG. 10 is a sequence diagram illustrating a flow of installation of a bypass driver according to the first embodiment.

A process performed until installation of the bypass driver 390 is completed is the same as that of the flow illustrated in FIG. 10. After step S1025, the bypass driver 390 instructs a web browser 380 to request the bypass driver 390 to issue an access token, and thereafter, the flow of FIG. 12 is continued as a series of processes. However, the transmission of an installation set in step S1014 includes not only an instruction for activating a setup module but also an instruction for starting obtainment of an access token. Specifically, a case where an access token is issued at a timing when a bypass driver is installed will be described as an example. The timing when an access token is issued is not limited to this, and an access token may be issued when the bypass driver is initially activated, when the bypass driver is initially operated, or when the bypass driver is arbitrarily operated. In any case, an authentication screen described below is displayed at a unique timing.

First, a process is started when the web browser 380 receives an instruction for starting obtainment of an access token. In step S1201, the web browser 380 transmits a request for obtaining an access token to the bypass driver 390. This process is realized by including a JavaScript (registered trademark) instruction used to activate a token requesting unit 396 of the bypass driver 390 in the instruction for starting obtainment of an access token. Furthermore, when a bypass driver is installed, a URL unique to the bypass driver may be generated and the bypass driver may be accessed using a web browser in accordance with the URL. In step S1202, the token requesting unit 396 of the bypass driver 390 redirects the web browser 380 to the print service 340. A user authentication unit 355 of the print service 340 permits access by a user who operates the web browser 380 which is redirected by the bypass driver 390. In step S1203, the user authentication unit 355 displays an authentication screen illustrated in FIG. 4C in the redirected web browser 380 for authentication of the user and causes the user to input authentication information. In step S1204, the web browser 380 transmits the input authentication information to the user authentication unit 355 so as to issue an authentication request. In step S1205, the user authentication unit 355 transmits the received authentication information to a user information management unit 356 so that the user is identified. Furthermore, the bypass driver 390 which requires the access token is also verified by extracting information from the user's access.

When the authentication is successfully performed, the user authentication unit 355 causes the user to determine whether an access token is to be issued to the bypass driver 390 in step S1206. Here, the user authentication unit 355 displays an authentication screen illustrated in FIG. 4F in the web browser 380 so that permission is obtained from the authenticated user, and causes the user to perform a permission operation. In step S1207, the web browser 380 transmits a result of user's input as a response. In step S1208, the user authentication unit 355 checks whether the permission of the user has been obtained. When the determination is affirmative, the user authentication unit 355 generates a permission code used to issue an access token.

In step S1209, the user authentication unit 355 causes the bypass driver 390 which is an access source to perform redirection to the web browser 380 again. The redirection request includes the permission code generated in step S1208. In step S1210, the web browser 380 transmits the permission code to the token requesting unit 396 of the bypass driver 390 in response to the redirection request issued in step S1209.

In step S1211, the token requesting unit 396 requests the print service 340 to issue an access token using the obtained permission code. Note that the authentication of the bypass driver 390 which has accessed the print service 340 may be performed by a client certificate included in the installation set in advance, for example. When the authentication service is used, in general, authentication information is required. However, the authentication information is not required when the client certificate is used, and accordingly, the user does not perform a special operation for authentication. In step S1212, the user authentication unit 355 of the print service 340 obtains information on the bypass driver 390 which has requested an access token from the received request for issuing an access token and checks validity. If the validity is confirmed, validity of the permission code received in step S1211 is further checked. When the validity is confirmed again, the user authentication unit 355 issues an access token corresponding to the received permission code in step S1213. In step S1214, the user authentication unit 355 returns the access token as a response to step S1211 to the token requesting unit 396. Finally, in step S1215, the token requesting unit 396 stores the received access token in a user data storage unit 395.

When the obtained access token is used hereafter, the user authentication process performed at a time of execution of printing may be skipped. Specifically, when the access token is used in the connection in step S1111, the process from step S1112 to step S1115 may be skipped. Here, the user data storage unit 395 stores information to be distinguished according to users. Since the access token is unique information for each user, the access token is stored in the user data storage unit 395 instead of a printer data storage unit 394. By this function, even when a plurality of users use a client 180, each of the users does not see and output print jobs of the other users. In general, a user is specified by a login to the client 180 and the user data storage unit 395 is also automatically specified for each user managed by an OS.

By the functions described above, access authority may be securely transferred to a bypass driver and complicated processes including an authentication process are not performed by a user for each printing process. Accordingly, user-friendliness is improved. In this embodiment, a screen which accepts user's inputs corresponds to the web browser 380, for example. However, an installer 410 or the bypass driver 390 may have such a function. Furthermore, in this embodiment, the instruction for starting obtainment of an access token is received from the print service 340, for example. However, the instruction may be issued by an installer in an installation flow or may be explicitly issued by the user.

Third Embodiment

Although a type and a version of an OS installed in a client are not mentioned in the first and second embodiments, a plurality of types and a plurality of versions of OSs exist in practice. When different OSs are used, different printer drivers having different architectures are to be installed. Therefore, if only one type of driver set of a bypass driver is used, some clients are not supported.

Accordingly, in this embodiment, a method for determining a type and a version of an OS installed in a client and installing a bypass driver having architecture corresponding to the OS is described. Configurations and flows in portions not described are the same as those of the first embodiment or the second embodiment in principle.

Figure 7C:
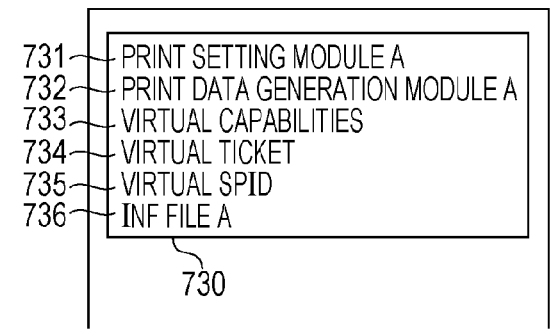
FIG. 7C is a diagram illustrating a configuration of a driver set according to a third embodiment.
Figure 7D:
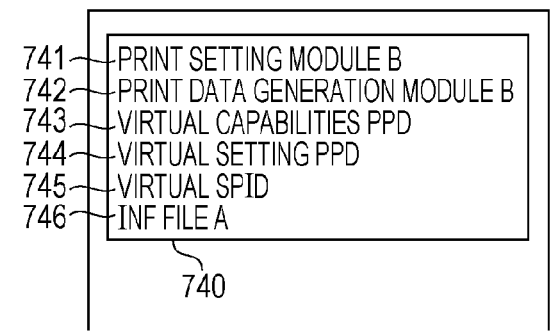
FIG. 7D is a diagram illustrating a configuration of a driver set according to the third embodiment.

A print service 340 provides driver sets corresponding to a plurality of OSs in advance. For example, modules and a data format of architecture operating in an operating system OS-A are illustrated in FIG. 7C, and modules and a data format of architecture operating in an operating system OS-B are illustrated in FIG. 7D. PPD files illustrated in FIG. 7D represent postscript printer description files. Although the PPD has a description format different from those of capabilities and a ticket, the PPD similarly represents capabilities of a printer (capabilities PPD) and a print setting (setting PPD) which is a subset of the capabilities as a function.

Figure 13:
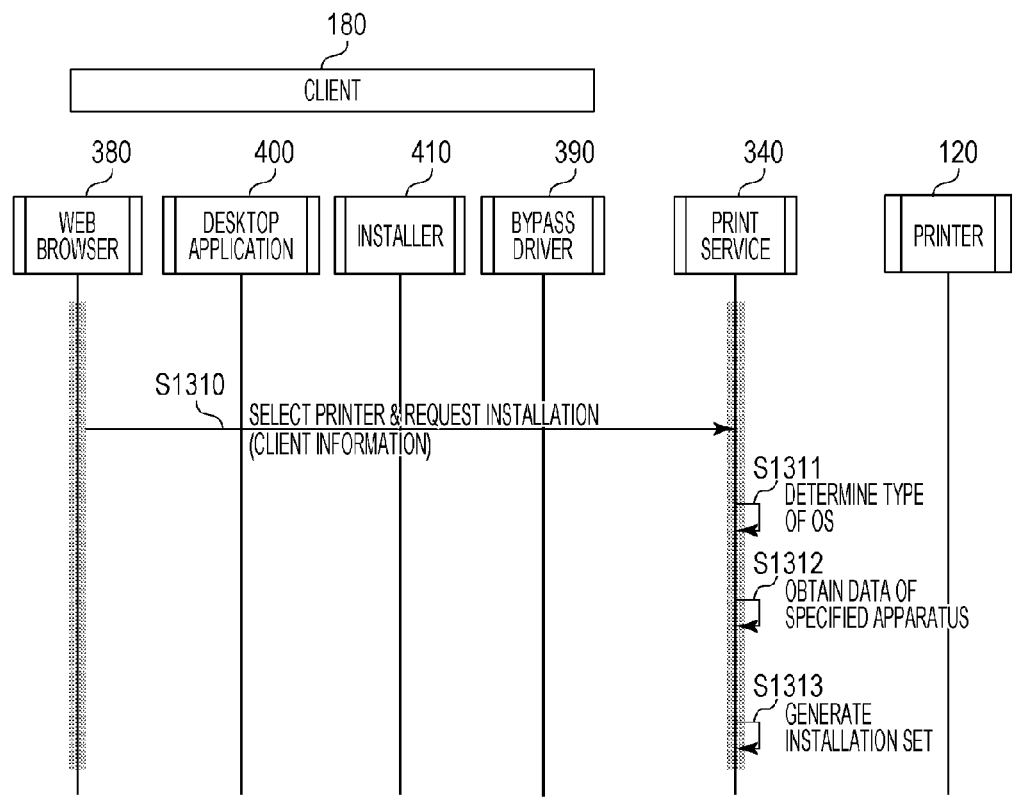
FIG. 13 is a sequence diagram illustrating a flow of configuration of a bypass driver in accordance with an OS according to the third embodiment.

When a user instructs installation of a bypass driver in a printer list screen illustrated in FIG. 4D displayed by the print service 340, a process of generating an installation set from step S1011 to step S1013 is changed as below. Hereinafter, a description will be made with reference to a flowchart of FIG. 13.

A web browser 380 transmits an SPID of a target printer in step S1310. Simultaneously, the web browser 380 transmits OS information. For example, OS information of a client serving as a transmission source may be transmitted by transmitting an identification name of a user agent. In step S1311, when receiving the OS information, the print service 340 determines a type and a version of an OS of a client 180. In step S1312 and step S1313, an installation set is generated. However, when it is determined that the client 180 has an operating system OS-A, a driver set illustrated in FIG. 7C is selected, whereas when it is determined that the client 180 has an operating system OS-B, a driver set illustrated in FIG. 7D is selected. Then an installation set is configured. In this way, the installation set corresponding to the OS of the client 180 is configured and transmitted. Thereafter, a process the same as the process from step S1014 of FIG. 10 is performed.

By the functions described above, a bypass driver having architecture suitable for an OS installed in a client may be automatically installed. Then the user has little awareness of client information and user-friendliness is improved at a time of installation. Although the case where an OS is automatically determined is described as an example, a flow of selecting a type and a version of an OS when an instruction for installing a bypass driver is issued may be employed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a matter of authentication to be performed when print service is accessed using a printer driver for printing can be solved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261309, filed Nov. 29, 2012, which is hereby incorporated by reference herein in its entirety.

REFERENCE SIGNS LIST

120 Printer
340 Print service
360 Web application
380 Web browser
390 Bypass driver
400 Desktop application
410 Installer

The invention claimed is:

1. An information processing apparatus capable of communicating with a print server system including print service which generates a print job using content data and a print setting and which transmits the generated print job to a printer through a network, the information processing apparatus comprising:
a memory;
a processor coupled to the memory which executes the following:
receiving a permission screen used to determine whether transfer of a user's authority for using the print service to a printer driver is permitted from an authentication server system operating in cooperation with the print server system and displays the received permission screen,
wherein a display unit displays the permission screen before the printer driver is distributed from the print service, and
wherein authority information is issued from the print service in response to the transfer of the user's authority having been permitted by a user via the received permission screen;
receiving an install set generated by the print server in response to a printer having been selected in a printer list, the install set being for a printer driver of the selected printer and the printer driver including a driver set, actual data, a setup tool and the authority information, and configured to install the printer driver of the selected printer, using the install set;
activating the printer driver, which provides a print setting screen and which transmits content data stored in a memory of the information processing apparatus and a print setting input using the print setting screen to the print service through a network; and
transmitting the authority information representing that user's authority for using the print service is transferred to the printer driver when the user issues an instruction for printing to be performed through the printer driver after the printer driver is activated and transmit the content data and the print setting through the network.

2. The information processing apparatus according to claim 1, further comprising displaying the permission screen when the printer driver is installed, when the printer driver is initially activated, or when the printer driver is operated.

3. The information processing apparatus according to claim 1, further comprising:
storing the authority information by installing an installation set of the printer driver including the authority information issued by transmitting the information representing that the user's permission performed in the permission screen to the authentication server system.

4. The information processing apparatus according to claim 3, wherein the installation set of the printer driver includes a client certificate required when authentication service provided by the authentication server system is used, and authentication information is not requested by the authentication server system when the authority information is issued.

5. A method for controlling a print server system capable of communicating with a client, the method comprising:
generating a print job from content data and a print setting using print service;
transmitting the generated print job to a printer through a network using the print service;
receiving a permission screen used to determine whether transfer of a user's authority for using the print service to a printer driver is permitted from an authentication server system operating in cooperation with the print server system and displays the received permission screen,
wherein the permission screen is displayed before the printer driver is distributed from the print service, and
wherein authority information is issued from the print service in response to the transfer of the user's authority having been permitted by a user via the received permission screen;
receiving an install set generated by the print server in response to a printer having been selected in a printer list, the install set being for a printer driver of the selected printer and the printer driver including a driver set, actual data, a setup tool and the authority information, and configured to install the printer driver of the selected printer, using the install set;
distributing, using a distributing unit, the printer driver which provides a print setting screen and which transmits content data stored in a memory of the client and a print setting input using the print setting screen to the print service through the network; and
receiving, using a reception unit, through the network, the authority information representing that user's authority for using the print service is transferred to the printer driver, the content data, and the print setting which are transmitted from the printer driver distributed to the client.

6. A non-transitory storage medium storing a program which causes an information processing apparatus to execute the control method set forth in claim 5.

7. A non-transitory storage medium storing a program of a printer driver installed in an information processing apparatus capable of communicating with a print server system including print service which generates a print job using content data and a print setting and which transmits the generated print job to a printer through a network, the program comprising:
- displaying a print setting screen; and
- receiving a permission screen used to determine whether transfer of a user's authority for using the print service to a printer driver is permitted from an authentication server system operating in cooperation with the print server system and displays the received permission screen,
- wherein the permission screen is displayed before the printer driver is distributed from the print service, and
- wherein authority information is issued from the print service in response to the transfer of the user's authority having been permitted by a user via the received permission screen;
- receiving an install set generated by the print server in response to a printer having been selected in a printer list, the install set being for a printer driver of the selected printer and the printer driver including a driver set, actual data, a setup tool and the authority information, and configured to install the printer driver of the selected printer, using the install set;
- a transmission step of transmitting the authority information representing that user's authority for using the print service is transferred to the printer driver, content data stored in a memory of the information processing apparatus, and a print setting input using the print setting screen to the print service through a network in response to an instruction for printing.

* * * * *